United States Patent [19]

Neff

[11] 4,043,018
[45] Aug. 23, 1977

[54] METHOD AND TOOL FOR REMOVING TUBES FROM MULTI-TUBE FINNED HEAT EXCHANGE COIL

[75] Inventor: Edward C. Neff, Norman, Okla.

[73] Assignee: Westinghouse Electric Corporation, Pittsburgh, Pa.

[21] Appl. No.: 642,094

[22] Filed: Dec. 18, 1975

[51] Int. Cl.² ............................................. B23P 19/02
[52] U.S. Cl. .................................... 29/427; 29/157.4; 408/1 R
[58] Field of Search ...................... 29/427, 426, 401 F, 29/202 D, 202 R, 157.4, 270, 280, 282, 234, 235; 408/230, 26, 118, 199; 30/92.5, 92, 352; 15/104.02

[56] References Cited
U.S. PATENT DOCUMENTS

| | | | |
|---|---|---|---|
| 2,411,246 | 11/1946 | Clapper | 408/1 |
| 2,918,955 | 12/1959 | Simas | 408/230 X |
| 3,058,199 | 10/1962 | Cave et al. | 408/230 X |
| 3,176,384 | 4/1965 | Johnson | 29/280 |

Primary Examiner—James R. Duzan
Attorney, Agent, or Firm—E. C. Arenz

[57] ABSTRACT

Damaged tubes are removed from a multi-tube finned coil of the type in which the tubes are expanded into the fins by cutting a helix in the tube wall for the length of the tube from internally of the tube and then pulling the tube out by collapsing the helix upon itself.

The tool for accomplishing this has a cutting end portion which has a succession of cutting teeth in a helical array in one rotative direction and with the tips of the cutting teeth successively along the length of the cutting end portion generally progressing radially outwardly from about the internal diameter of the tube to about the external diameter of the tube to be removed, the cutting portion also having a series of flutes extending helically along the length of the cutting end portion in the opposite direction from the helical array of the teeth, the tool being used to carry out the method of cutting a helix into the wall of the tube as the cutting end portion of the tool passes through the length of the tube.

6 Claims, 6 Drawing Figures

METHOD AND TOOL FOR REMOVING TUBES FROM MULTI-TUBE FINNED HEAT EXCHANGE COIL

BACKGROUND OF THE INVENTION

1. Field of the Invention

The invention pertains to the art of tools and methods for removing a tube from a multi-tube finned heat exchange coil of the type in which the tubes are expanded into the fins throughout the length of the tube.

2. Description of the Prior Art

To best understand the application of the invention, a brief description of the general type of heat exchange coil to which it is believed most applicable is in order. Many heat exchange coils are now constructed with a large number of aluminum tubes extending transversely through holes in aluminum fins. After the assembly of the tubes to the fins, the tubes are then expanded outwardly to seat tightly against the fin material defining the holes in which the tubes are situated. Then aluminum end bends and other fittings such as tripods, crossovers, and various headers are placed on the open ends of the tubes and the heat exchanger is subjected to an operation in which these fittings are soldered to the tube ends. The different types of soldering operations which may be used include several, such as flame soldering and superheated air soldering, in which some of the joints may become sufficiently hot that one or more end bends or other fittings may be effectively destroyed along with the bell end of the tube in which the fitting is located. This problem can arise, as explained in U.S. patent application Ser. No. 580,506 filed May 23, 1975, because different fittings present different heat transfer problems so that while that temperature may be quite proper for one type of joint it may be too hot for another particular joint and damage to the tube ends and fittings may result. The problem may also arise from temperature differences at different locations in a superheated air atmosphere or in a flame soldering process. Further, defects in the tube, such as pin holes, splits, cracks etc., can also cause leaks which would require tube removal.

Irrespective of the cause, a tube which has its end damaged sufficiently that the repair cannot take place easily requires that the particular tube be removed. It has been my experience that frequently the damage is sufficient, and the prior art tube removal processes so ineffective, that the practice has been to scrap the entire coil. Since many of the coils include substantial material in the form of tubes, fins and fittings, as well as labor cost invested therein, scrapping of the coils is very costly to the manufacturer.

Processes for removing defective tubes from a heat exchanger are known as evidenced by the following U.S. Patents for example: U.S. Pat. Nos. 3,835,520; 2,731,714; 2,411,246; and 408,162. These patents are generally directed to arrangements for removing a tube from heat exchangers of the tube and shell type or which have a tube sealed at opposite ends in a tube sheet with intermediate transverse plates simply providing tube support. In removing tubes from this type of structure, the process is basically that of loosening or manipulating only the tube ends to a degree sufficient that the tube is loosened thereat, after which the tube may be withdrawn. Such processes may work well with that type of heat exchange structure, but would be totally ineffective with the type of heat exchanger with which the present invention is concerned, and in which the tube is expanded outwardly throughout its total length to seat tightly in the apertures of each of the fins or plates through which the tube passes. In other words, if only the ends of the tubes in the expanded tube heat exchanger were loosened, it would be of little help in permitting the tube to be withdrawn from the heat exchanger as a whole.

One way which has been suggested for removing an expanded tube from a heat exchanger, and which has not been particularly effective, is to slit the wall of the tube longitudinally at two or more locations around the circumference by a device somewhat like a double blade glass cutter which is pushed through the tube.

Finally, there have been various tools, combined with particular methods, devised for removing tubes and pipes from heat exchangers and like apparatus, examples of such patents being U.S. Pat. Nos. 3,729,806, 3,341,930, 3,176,384, and 1,276,458.

None of the above-noted patents teach a method or tool which will permit the removal of an expanded tube sufficiently effectively in my view that the scrapping problem of damaged coils would be avoided. Accordingly, it is the aim of my invention to provide a method and tool which permits the relatively easy removal of expanded tubes, leaving the hole from which the tube was removed in such condition that the tube can be replaced and the coils can be inexpensively salvaged.

SUMMARY OF THE INVENTION

In accordance with the invention, in its broader aspect the method comprises removing an expanded tube by the steps of first cutting a helix in the tube wall for the length of the tube and then pulling the tube out by collapsing the helix on itself. This is accomplished with a tool that has a tapered cutting end portion with a succession of cutting teeth in a helical array in one rotative direction with the taper progressing from the lead end, where the outer diameter of the tool at the tips of the teeth is about equal to the inner diameter of the tube, to the trailing end where the diameter at the tips of the teeth about equal the outer diameter of the tube to be removed, the tool also having a series of flutes which preferably extend helically along the length of the cutting end portion of the tool in the opposite rotative direction from the helical array of the teeth. The intent of these flutes is to remove chips from the tube at the cutting points.

DRAWING DESCRIPTION

DESCRIPTION OF THE PREFERRED EMBODIMENTS

Figure 1:
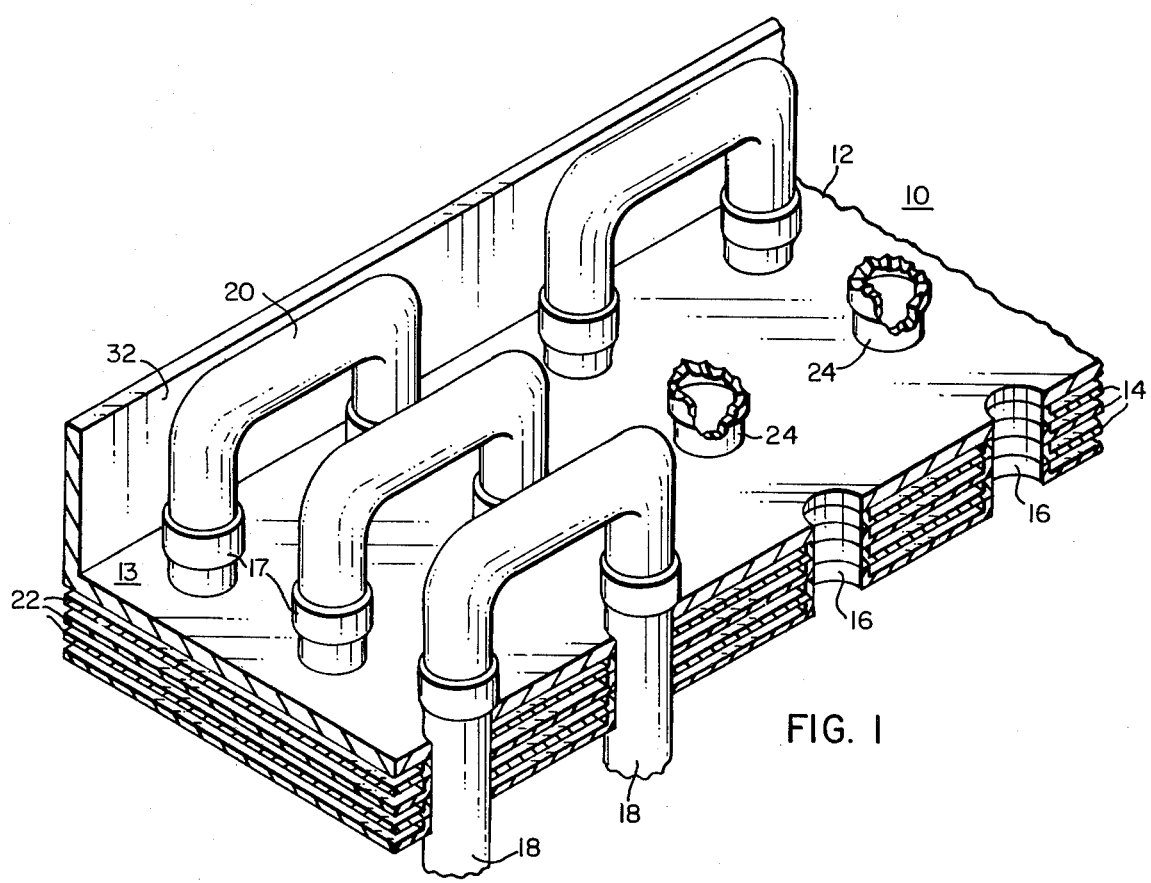
FIG. 1 is a fragmentary, partly-broken isometric view of a small part of an end of a heat exchanger coil which has undergone a soldering operation and in which one end bend portion is depicted in a typically damaged condition.

Referring to FIG. 1, a fragmentary part of a heat exchange coil 10 is shown and includes an end plate 12, a series of parallel fins 14 provided with apertures 16 therein, a number of tubes 18 which extend through the aligned apertures, and end bends 20 soldered to the open ends of the tubes 18. The joint 22 between the end bends 20 and the tubes 18 is typically of a bell and spigot arrangement in which, after the tubes have initially been inserted through the fins and expanded, the end portions of the tubes are belled out or enlarged in diameter sufficiently to receive the open ends of the end bends. Prior to assembling the fittings to the open ends of the tubes, the tubes 18 are expanded in diameter throughout their length to provide a tight contact with the fin collars which define the openings through which the tubes 18 pass.

After the end bends and any other fittings which may be used are assembled to the open ends of the tubes, the coil is subjected to a soldering operation in which the joints between these various fittings and tubes are sealed. In the soldering operation it sometimes happens that a part or all of a joint 22 is effectively destroyed by a localized elevated temperature which may result in tube ends appearing as indicated at 24. Effectively, the part of the tube end which is necessary to make a good sealing joint is missing. Accordingly these tubes with destroyed tube ends must be removed and replaced before the coil can be repaired with a new end bend or other fitting. The problem of destruction of the tube ends is experienced for the most part with those heat exchangers which use aluminum tubes and fittings, although it may occur infrequently where the tubes and end bends are copper.

Figure 2:
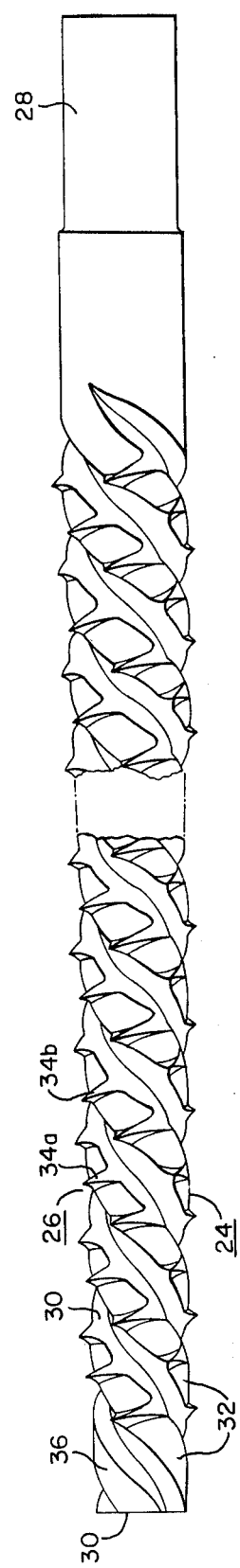
FIG. 2 is a broken, side view of the tool of the invention.
Figure 3:
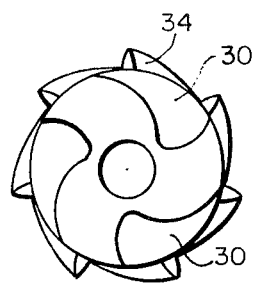
FIG. 3 is an end view of the lead end of the tool of FIG. 2.

For carrying out the invention, a tool 24 as illustrated in FIGS. 2 and 3 is used. The tool basically comprises a cutting end portion 26 and a shank 28 which together preferably have a length in excess of the length of tube to be removed by the particular tool.

The tool according to the invention may be made from a standard, left-hand fluted, tapered reamer. As illustrated in FIG. 2, three left-hand flutes 30 extend helically along the length of the cutting end portion 26. The ridges 32 which define the crests between the flutes on the standard tool are machined by following a helical path which leaves the upstanding cutting teeth in a helical array. With three flutes 30 in the left-hand helical array, and machining the tool so that the right-hand helical array of the teeth are arranged to cut a single helix, a succession of eight cutting teeth will be found in the helical array from cutting tooth 34a to 34b (inclusive) which are in the same axially extending row of teeth along the cutting portion. In that connection, referring to FIG. 3, when viewing the tool from the leading end, and ignoring the taper, seven axially extending rows of cutting teeth may be seen.

The cutting tool illustrated has a cutting end portion machined so that a single helix will be cut, such a tool being found to work quite satisfactorily on three-eighths inch aluminum tubing. However, it is conceivable that where the tube to be removed is of larger diameter and has a thicker wall it may be desirable to have a double helix cutting tooth arrangement.

The leading end 36 of the tool serves as a guide or pilot while the tool is passing through the tube end accordingly need not be provided with cutting teeth.

The diameter of the leading end is slightly less than the inner diameter of the tube to be removed. The diameter of the cutting end portion at its trailing end, as measured between the tips of opposite teeth, is about the same as the outer diameter of the tube. Depending upon the material of the tube, the maximum diameter may be equal to or slightly in excess, such as 0.001 inch (0.0025 mm), or if the material tears rather easily, as aluminum heat exchanger tubes typically do, the maximum diameter may be slightly less than the outer diameter of the tube, such as 0.002 inches (0.0052 mm) less than the outer diameter of the tube.

Figure 4:
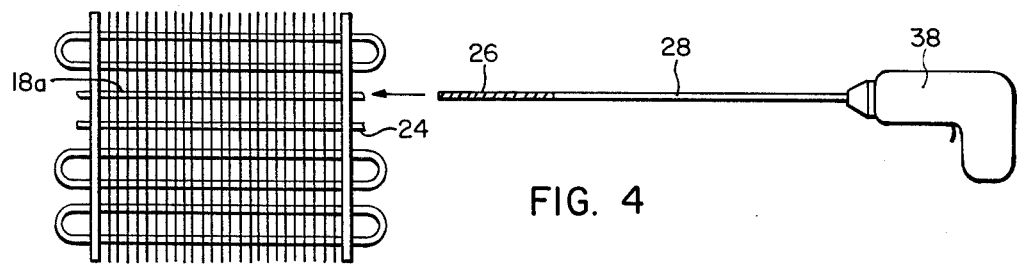
FIG. 4 is a partly diagrammatic view showing the tool in a position for beginning a tube removal operation on a coil with several damaged tubes.

The shank 28 of the tool may simply be a steel rod which is welded to the trailing end of the cutting portion and preferably has sufficient length that the cutting end portion and the shank are enough in excess of the length of the tube to be removed that the cutting end portion 26 can pass out the one end of the tube before the drill chuck contacts the other end. This length relationship may be perceived from FIG. 4 in which the tool 24 is shown with the cutting end portion 26 about to be moved into engagement with a tube 18a to be removed and with the trailing end of the shank 28 in the chuck of an electric drill. A less satisfactory arrangement would be to use a tool having a total length over half of, but less than, the tube length. This would require cutting a helix in from both ends, with a center overlap, and also withdrawing the tool in both cases by reversing the drill.

Figure 5:
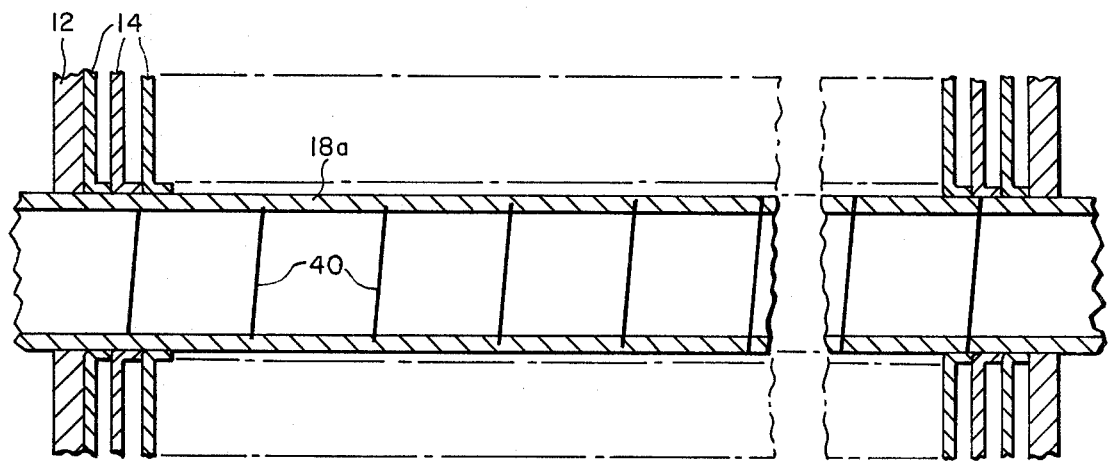
FIG. 5 is a fragmentary view, partly broken, of a single tube which is to be removed and illustrating the helical cut obtained with the method according to the invention.

The method is carried out by rotating the tool 24 in a right-hand direction by the electric drill 38, with the cutting teeth progressively engaging the inside wall of the tube and cutting a helix 40 into the tube, as shown in FIG. 5, and with the engagement of the teeth in the helix drawing the tool forwardly at a rate that the helix is progressively cut into the tube wall.

Figure 6:
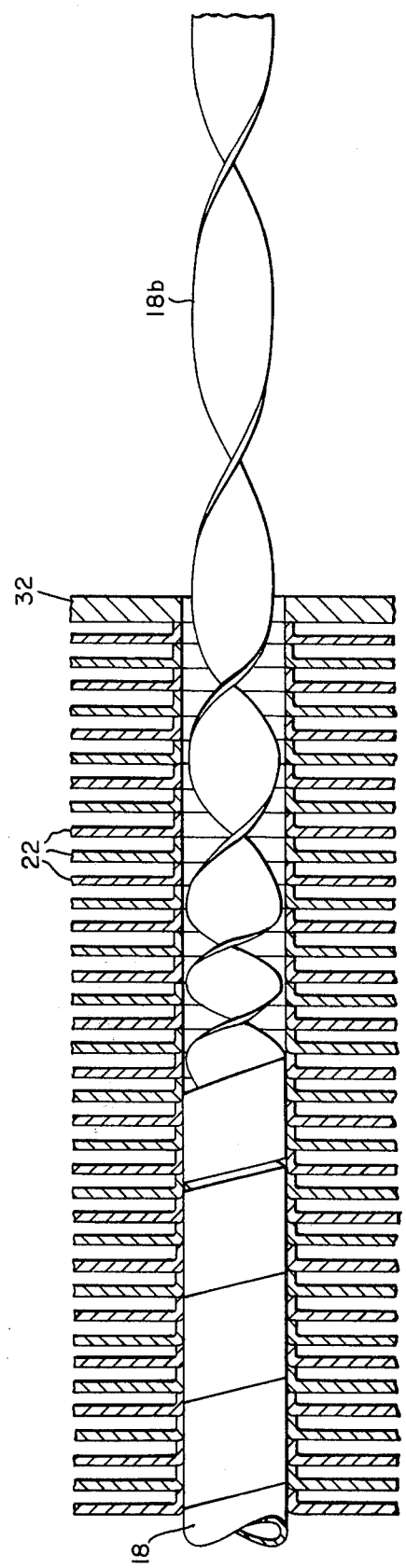
FIG. 6 is a view of a form of ribbon which the tube takes in being removed from the heat exchanger.

In FIG. 5, the single tube 18a which is illustrated as undergoing a tube removal process shows the helical cuts 40 in the wall as if the tool had been halted near the left end of the tube (which shows the taper of cutting depth at that location) and withdrawn by reversing the rotation of the drill 36. In a normal operation of course, the tool is rotated through the total length of the tube until the cutting end portion 26 totally exits the end opposite from which it entered. Then the trailing end of the shank 20 is released from the chuck of the drill, and the shank also pulled out of the tube to be removed. By grasping a piece of the tube which projects beyond an end plate 12, the tube is then removed by pulling on this part so that the tube collapses upon itself and forms the helical ribbon 18b (FIG. 6) as it is being removed.

It is currently preferred that the flutes 30 be arranged in a helical path in the opposite direction from the helical array of cutting teeth, so that as the tool is rotated clockwise to advance the flutes will end to carry the chips generated by the cutting operation toward the leading end of the tool and out the end of the tube toward which the tool is progressing. However, it is also within the contemplation of the inventon to either have axially extending flutes to simply accommodate the chips, or to have flutes helically arrayed in the same direction as the teeth. In this latter case, the flutes would preferably continue in that part of the tool between the trailing end teeth and the shank 28 to prevent binding of the tool in the tube.

I claim:

1. The method of removing a tube from a multi-tube finned heat exchanger coil of the type in which the tubes are expanded into the fins comprising cutting a helix in the tube wall for the length of the tube and then pulling the tube out by collapsing the helix formed in the tube wall.

2. The method of removing a tube from a multi-tube finned heat exchanger coil comprising:
   turning a tool, having a succession of cutting teeth arranged in a helix, through the length of the tube to cut a corresponding helix in the wall of the tube, and
   applying tension to collapse the tube helix progressively for the length of the tube while simultaneously elongating the helix and withdrawing it from the coil.

3. The method of removing an expanded tube from a multi-tube finned heat exchanger coil comprising cutting a single helix in the tube wall for the length of the tube by rotating and advancing a helix cutting tool in one pass through the tube, and then applying tension to an end of the tube to collapse the helix progressively for the length of the tube while simultaneously elongating the helix and withdrawing it from the coil.

4. A tool for removing an expanded tube of given length, internal diameter, and external diameter from a multitube finned coil heat exchanger comprising:
   a cutting end portion and a shank,
   said cutting end portion having a succession of cutting teeth arranged in a helical array in one rotative direction, the tips of the cutting teeth successively along the length of the cutting end portion generally progressing radially outwardly from about the internal diameter of the tube to about the external diameter of the tube, the cutting end portion being adapted to cut a helix into the wall of the tube upon being rotated in the tube, and
   a series of flutes extending along the cutting end portion to receive the chips generated by cutting the helix.

5. A tool according to claim 4 wherein said flutes extend helically along the tool in the opposite rotative direction from the rotative direction of the cutting teeth.

6. A tool according to claim 4 wherein said cutting end portion and said shank together have a length in excess of said given length of said teeth.

* * * * *